(12) United States Patent
McMillan et al.

(10) Patent No.: US 7,051,757 B2
(45) Date of Patent: May 30, 2006

(54) FLOW SYSTEM WITH HIGH RESOLUTION PROPORTIONAL VALVE WITH CUSTOMIZABLE PERFORMANCE

(75) Inventors: Robert M. McMillan, Georgetown, TX (US); Edwin L. Hankinson, Georgetown, TX (US)

(73) Assignee: McMillan Company, Georgetown, TX (US)

( * ) Notice: Subject to any disclaimer, the term of this patent is extended or adjusted under 35 U.S.C. 154(b) by 114 days.

(21) Appl. No.: 10/461,020

(22) Filed: Jun. 13, 2003

(65) Prior Publication Data

US 2004/0250856 A1    Dec. 16, 2004

(51) Int. Cl.
*G05D 7/06* (2006.01)
*F16K 7/16* (2006.01)
*F16K 31/524* (2006.01)

(52) U.S. Cl. .................. 137/487.5; 137/486; 251/251; 251/331; 251/368

(58) Field of Classification Search ................ 137/486, 137/487.5; 118/715; 251/58, 251, 331, 251/368; 700/282
See application file for complete search history.

(56) References Cited

U.S. PATENT DOCUMENTS

| | | | | |
|---|---|---|---|---|
| 4,467,660 A | | 8/1984 | McMillan | |
| 4,609,178 A | * | 9/1986 | Baumann | 251/229 |
| 5,205,539 A | * | 4/1993 | Schalk | 251/331 |
| 5,331,995 A | * | 7/1994 | Westfall et al. | 137/8 |
| 5,542,302 A | | 8/1996 | McMillan et al. | |
| 5,653,419 A | * | 8/1997 | Uchisawa et al. | 251/58 |
| 5,711,507 A | * | 1/1998 | Berget et al. | 251/129.04 |
| 5,728,949 A | | 3/1998 | McMillan et al. | |
| 5,899,437 A | * | 5/1999 | Quarre | 251/129.2 |
| 6,314,992 B1 | * | 11/2001 | Ohmi et al. | 137/486 |
| 6,363,958 B1 | * | 4/2002 | Ollivier | 137/2 |

FOREIGN PATENT DOCUMENTS

EP        0 957 298 A1 *  11/1999

* cited by examiner

*Primary Examiner*—Ramesh Krishnamurthy
(74) *Attorney, Agent, or Firm*—Bracewell & Giuliani LLP

(57) ABSTRACT

A flow system includes a proportional valve constructed of chemically inert materials (PTFE) to produce variable fluid flow rates of liquids including inert, and high purity, and even highly corrosive liquids. Gases of many varieties can also be flow controlled. The valve may be precisely set, either manually, or by use of an actuating motor, remotely or electronically, for various flow rates for the required fluid. The valve allows for specific proportional flow parameters to be programmed into valve structure and configuration to provide precise and repeatable highest resolution flow control for a wide variety of complex flow conditions (pressure, temperature and viscosity).

16 Claims, 4 Drawing Sheets

FLOW SYSTEM WITH HIGH RESOLUTION PROPORTIONAL VALVE WITH CUSTOMIZABLE PERFORMANCE

BACKGROUND OF THE INVENTION

1. Field of the Invention

The present invention relates to flow measurement and control systems and proportional valves for providing variable programmed flow rates in fluids in such systems.

2. Description of the Related Art

So far as is known, existing liquid flow control valve devices for proportional flow control applications have certain shortcomings or inadequacies. Proportional solenoid operated valves or a diaphragm valves have rapid operating speed. However, there are problems in programming solenoid and diaphragm valves inexpensively for accurate flow control under widely varying flow conditions.

Rotatable control valves typically have good flow control resolution and can hold flow set points. However, rotatable control valves are slow to respond. Further, rotatable control valves have problems with achieving high resolution over a wide range of flow rates in a relatively small valve size. In addition, programming for accurate flow control over a wide variety of flow conditions is often a problem.

Valve designs other than rotatable control valves have included diaphragm actuation for flow control and generally used more expensive diaphragm structure. These other types of valves do not have, so far as known, programmable actuating features. These other types of valve designs did not have programmable flow characteristics over widely varying flow conditions; higher resolution; and inexpensive programming characteristics.

A particular problem has been present when the fluid was in the form of a slurry, such as a polishing slurry of the type used in the semiconductor industry. These types of slurries often contained abrasive materials. Over a service life, it was necessary to adjust the valve flow control settings to compensate for component wear because of the effect of the abrasive materials in the slurries.

SUMMARY OF THE INVENTION

Briefly, the present invention provides a new and improved flow system for a fluid. The flow system includes a new and improved flow controller and may be a flow measuring system or a flow control system. The flow measuring device of the present invention includes a housing body having a flow receiving chamber in it, and a flow inlet and flow outlet for fluid supply to the flow receiving chamber.

An adjustable diaphragm member is formed along a portion of the flow receiving chamber of the flow measuring device and an actuator is provided to control the position of the adjustable diaphragm member to regulate the flow of fluid through the housing body. The actuator takes the form of a motor driving a cam and connected by a linkage to the adjustable diaphragm member to control the position of the diaphragm member to regulate the flow of fluid.

The flow system of the present invention may take the form of a flow measuring system with a flow controller of the present invention operating in conjunction with a flow sensing device. The flow system of the present invention may also take the form of a flow control system with a flow controller of the present invention operating in conjunction with a flow sensing device and a control device such as a computer or processor.

DETAILED DESCRIPTION OF THE PREFERRED EMBODIMENTS

Figure 5:
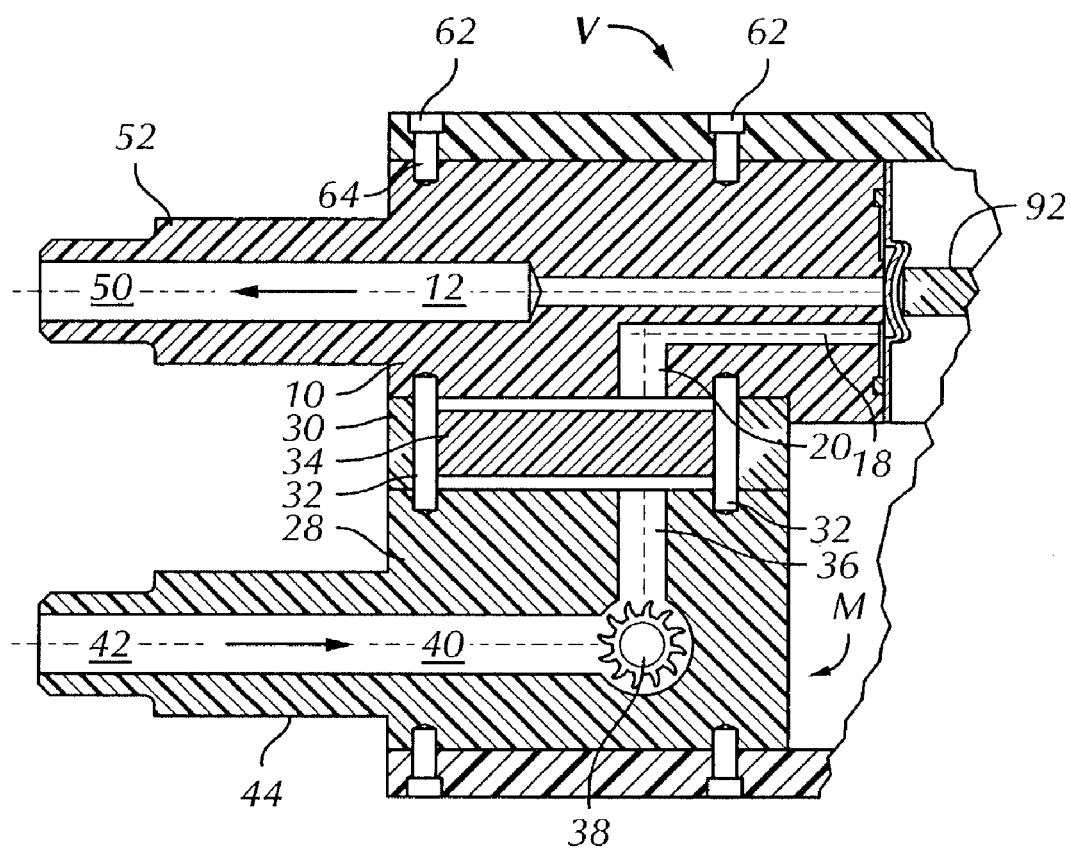
FIG. 5 is a side elevation view, taken in cross-section, of the proportional valve and flow measuring system of the present invention with fluid flow in a different direction from that of FIG. 1.
Figure 6:
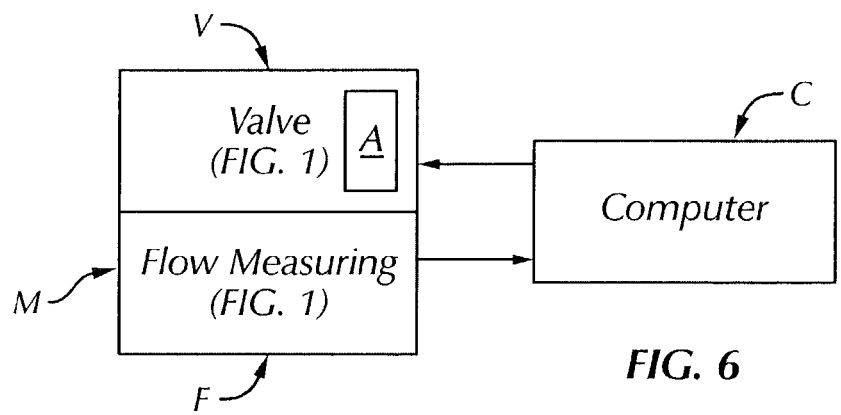
FIG. 6 is a schematic diagram of a flow control system according to the present invention based on the flow measuring system of FIG. 1 and a control computer.

In the drawings, the letter F (FIG. 6) designates generally a flow control system for controlling the flow of a fluid to desired flow parameters according to the present invention. The flow control system F includes a flow control valve V (FIGS. 1 and 2) in the form of a proportional valve, a flow measuring device or apparatus M (FIGS. 1 and 2) to measure the flow of the fluid, and a flow control device or computer C (FIG. 6). FIG. 5 of the drawings shows the flow control system F of the present invention of like structure to FIG. 1 but arranged to receive fluid flow in a reverse direction from that of FIG. 1. The flow control system F is suitable for fluids including liquids and gasses. The liquids may be inert or high purity, or even highly corrosive liquids, or slurries containing any of the foregoing types of liquids. The flow control system F of the present invention is also suitable for use with a wide variety of gasses to control the flow of the gas to desired flow parameters.

Considering first the proportional flow control valve V, a housing body 10 is preferably formed of an organic polymer, such as polytetrafluorethylene (PTFE), which is corrosion resistant so that the valve V may be used with both corrosive fluids and non-corrosive fluids. A flow inlet 12 is formed in the housing body 10 and communicates through a passage or conduit 14 to a flow receiving chamber 16. The flow-receiving chamber 16 is formed by removing a portion of a front wall 11 adjacent a surface 11a of the housing body 10. The flow-receiving chamber 16 is located between an annular flat surface 17 on a seal-receiving groove or slot 19. The annular flat surface 17 is located in a common plane with the front wall 11 and is adapted to be contacted by an adjustable diaphragm member 22. One or more, in the embodiment disclosed three, flow passages 18 are formed in the front wall 11 of the housing body 10. The number and size of flow passages 18 are based on flow requirements to conduct fluid from the flow receiving chamber 16 to a flow manifold or outlet 20 formed in a lower surface 21 of the housing body 10.

Figure 4:
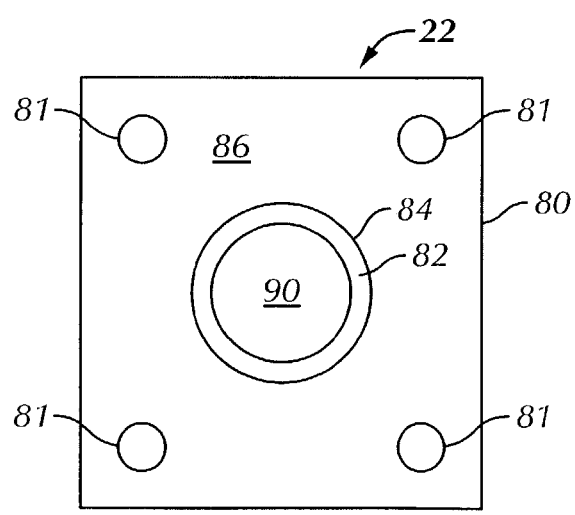
FIG. 4 is a view taken along the lines 4—4 of FIG. 3.

The adjustable diaphragm member 22 (FIGS. 1 and 4) of the flow control valve V, along with a surface portion 11a of the front wall 11 of the housing body 10, form the walls of the flow receiving chamber 16. The adjustable diaphragm member 22 is also preferably formed from PTFE so that corrosive fluids may flow through the flow control system F. The adjustable diaphragm member 22 is movable selectively inwardly and outwardly in response to an actuator assembly A to adjust the flow of fluid through the flow receiving chamber 16 and consequently through the flow housing body 10. As will be set forth, the adjustable diaphragm member 22 may move from a fully open position for maximum flow through the chamber 16 and the valve V to a fully closed position blocking flow of fluid through the valve V.

The flow measuring device M is mounted with the flow control valve V in fluid communication with the flow receiving chamber 16 through fluid outlet 20. As has been mentioned above, the system of FIG. 5 illustrates a flow control system like that of FIG. 1, but adapted to measure fluid flow. The flow measuring device M may be any of several types, depending on the type of fluid being measured, the operating conditions and the desired flow parameters, for example. The flow measuring device may be, by way of example, a turbine flow wheel flow measuring transducer of the types described in the U.S. Pat. Nos. 5,542,302; 5,728,949 or 4,467,660, each owned by the assignee of the present application. The subject matter of each of these patents is specifically incorporated herein by reference. For turbine flow wheel flow measuring transducers, the arrangement and mounting of the flow measuring transducers may be adjusted depending on the flow of fluid through the measuring system.

It should be understood, however, that the other types of flow rate sensors or measuring transducers may also be used with the present invention in place of the turbine wheel types discussed above. Examples of flow rate sensors based on other types of designs or technologies which could be used in connection with the present invention include the following types: impeller or Pelton wheel flow sensors; differential pressure sensing flow rate sensors; ultrasonic flow rate sensors; thermal detection flow rate sensors; Coriolis effect flow rate sensors; vortex shedding flow rate sensors; and other types as well.

Figure 1:
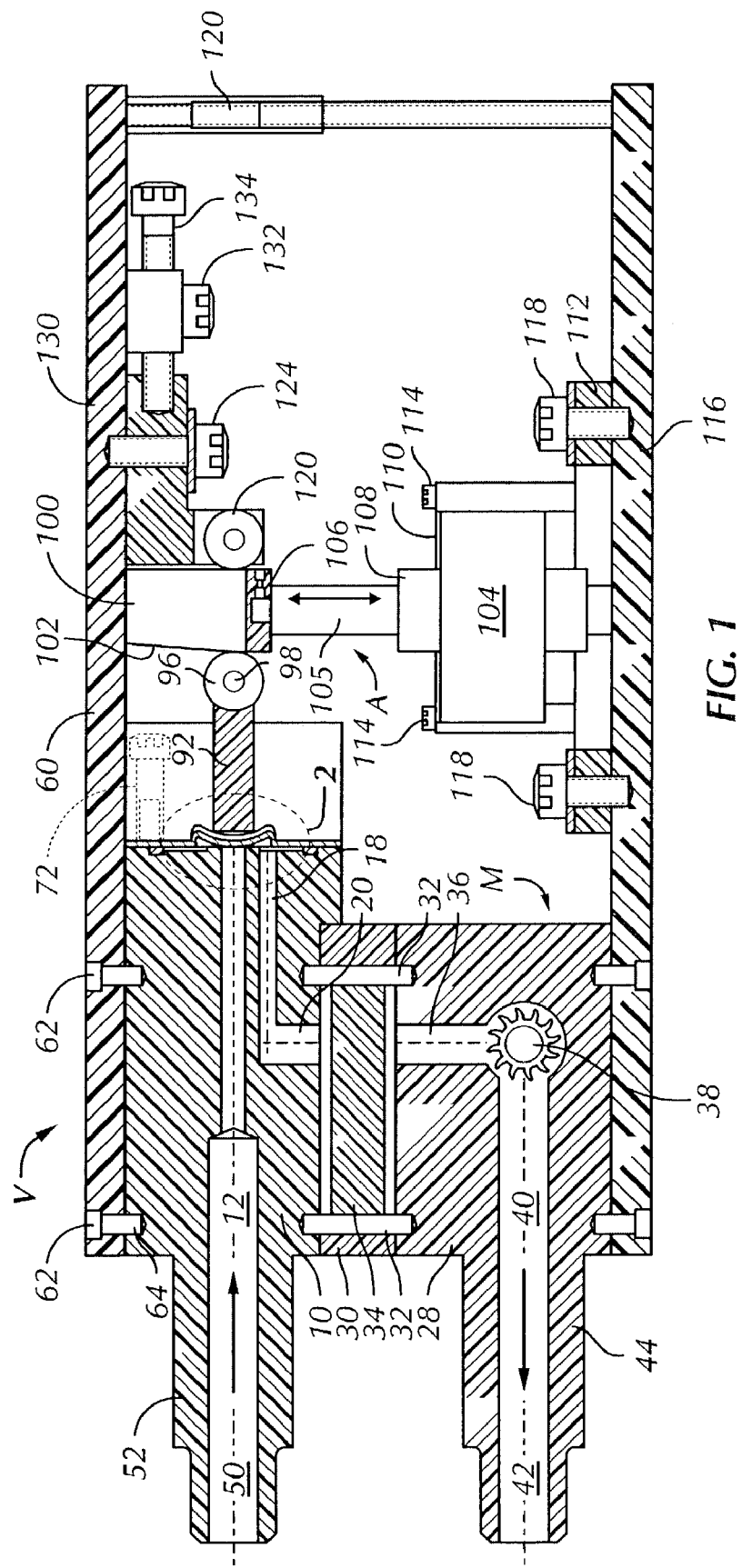
FIG. 1 is a side elevation view, taken in cross-section, of a proportional valve and flow measuring system according to the present invention.
Figure 2:
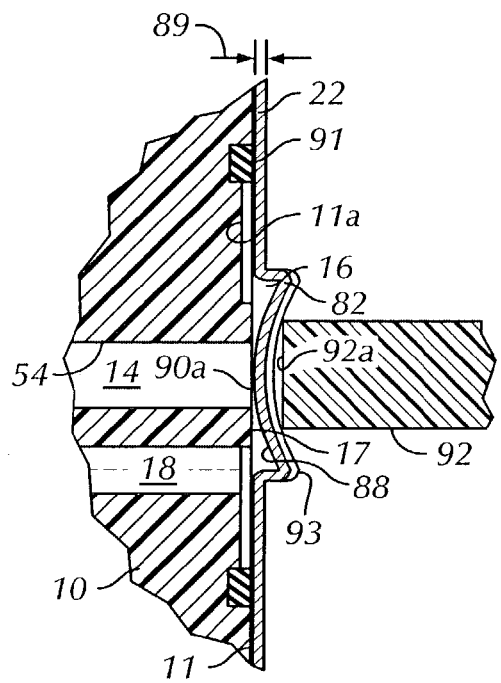
FIG. 2 is an enlarged view of a portion of the proportional valve of FIG. 1 encircled and having reference numeral 2 designating same.
Figure 3:
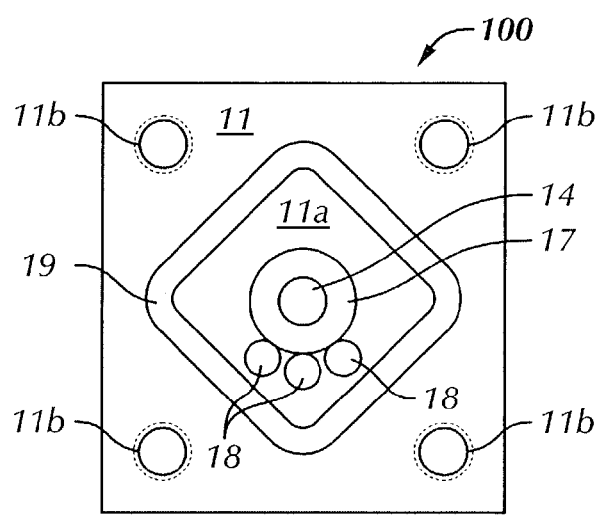
FIG. 3 is a view taken along the lines 3—3 of FIG. 2.

The flow measuring device or transducer M includes a transducer body 28 which is mounted to the housing body 10 of the flow control valve V through a connector or middle body 30 with dowel pins or other suitable connecting mechanisms. An annular fluid flow passage 34 is formed between the housing body 10 and the transducer body 28 to permit fluid flow from the fluid outlet 20 to a fluid inlet passage 36 of the flow measuring device M. The flow measuring transducer, such as a turbine wheel 38 in the flow measuring device M senses and measures the flow of fluid through the flow control system F. A transducer fluid outlet passage 40 allows fluid to flow from the measurement transducer 38 to an exit port or passage 42 in an outlet plug or tap 44 mounted with or integrally formed with the transducer body 28. As is shown in FIG. 1 and FIG. 5, the transducer M is adapted for fluid flow measurement in either direction of fluid flow. The structure of FIGS. 1 and 5 is the same except for the arrangement of the flow measuring transducer 38 which is determined by the direction of flow of the fluid to be measured. For this reason like reference numerals are used in FIGS. 1 and 5.

The measurements from the flow measurement transducer M are provided as information signals to the flow control device or computer C (FIG. 6) and there compared with a specified or established flow parameter. Variations in the flow parameters indicated as a result of comparisons in the computer C are sensed and used to form correction signals which are furnished to the actuator assembly A by the computer C to adjust the flow through the valve V and achieve the specified or established flow parameters in the flow control system F.

Considering now the structure of the flow control valve V, the flow passage 12 is connected to an inlet passage 50 in a flow inlet plug or housing tap 52 mounted with or integrally formed with the housing body 10. The flow passage 50 is of like diameter to the flow passage 12, which is connected to the flow passage 14 at a transition point 54. Fluid enters the flow receiving chamber 16 where flow control occurs in response to relative movement of the adjustable diaphragm 22 by the actuator A either by control signals from the computer C or by appropriate other input such as manual input entered as controls to the actuator A from an equipment operator. The outlet flow passage 18 leads from the flow receiving chamber 16 to an elbow 18*a* and an extension 18*b* and thence to flow outlet 20.

The housing body 10 is mounted with a top support plate 60 by a suitable number of appropriately spaced mounting nuts 62 and washers 64 such as Belleville washers. A bearing block 70 is mounted by connecting screws 72 to the rear wall or surface 26 of the housing body 10 beneath the top support plate 60. The flow receiving chamber 16 is formed by the adjustable diaphragm 22 in an inner central portion of the space between the bearing block 70 and the housing body 10. The adjustable diaphragm member 22 is mounted as one wall of the flow receiving chamber 16 and is engaged around outer surface portions 22*a* by an O-ring 76 or other suitable seal mounted in a seal receiving groove 78 formed on the rear surface 26 of the housing body 10.

The adjustable diaphragm member 22 of the proportional valve V is formed from a sheet 80 (FIGS. 2 and 4) of corrosion resistant synthetic resin, preferably PTFE, and is generally rectangular in form and of suitable thickness based on fluid flow conditions, valve responsiveness and accuracy, and other considerations. In one embodiment, the PTFE sheet 80 is about 0.015" thick. Openings 81 are formed in the sheet 80 for passage of connectors or screws 79 to mount the diaphragm member 22 with the housing body 10. The connectors are received in sockets 11*b* formed in the front wall 11 of housing body 10.

Figure 7:
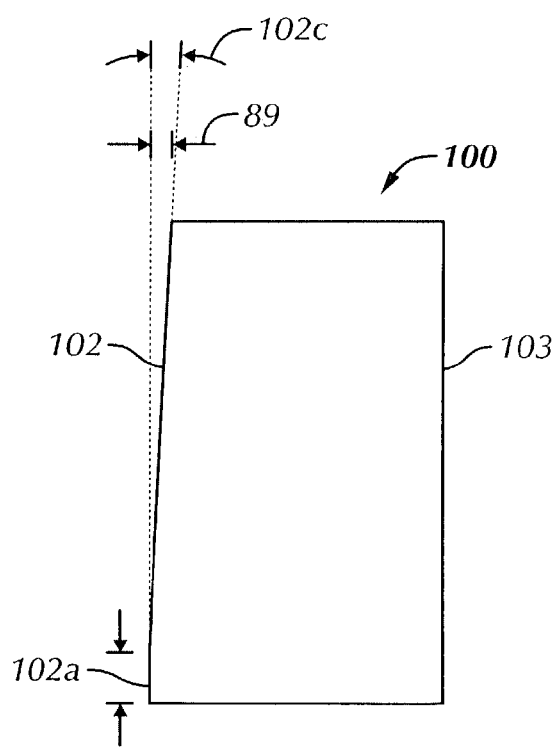
FIG. 7 is an enlarged view of a portion of the structure of proportional valve of FIG. 1.

A circular indentation or rim 82 (FIGS. 2 and 4) is formed in a central portion 84 of the adjustable diaphragm member 22 extending away from a front surface 86 of the PTFE sheet 80, facing inwardly towards the flow receiving chamber 16 of the housing body 10. A typical diameter of the circular rim 82 is 0.625". The depth of the indentation is such that an inner surface 88 of the adjustable diaphragm member 22 extends about one-third of its thickness, or 0.005", inwardly as indicated by arrows 89 (FIGS. 2 and 7) in the area of the circular indentation 82. A flexed inwardly extending central hub area 90 is formed in the adjustable diaphragm member 22 within the circular indentation 82 extending at its inner surface 88 towards the flow receiving chamber 16.

The adjustable diaphragm member 22 is flexible and the central hub area 90 is movable inwardly and outwardly with respect to the flow receiving chamber 16 in response to the actuator A to selectively vary the flow through the proportional valve V according to the expected fluid flow rate and control condition. A typical range of such movement of the central hub area 90 is about that of the thickness of the sheet 80, or 0.028" in the embodiment shown in the drawings, based on the dimensions of a cam 100 in the actuator A to be described below. Adequate movement is provided so that an innermost portion 90*a* of the hub area 90 at its innermost position sealingly engages the annular flat surface 17 between the flow receiving chamber 16 and the port at the innermost inward travel position in order to seal and block flow of fluid through the proportional valve V.

A seal device in the form of an O-ring seal 91 is formed in the seal-receiving slot or groove 19 in the housing body 10. The O-ring seal 91 may be made from any suitable sealing material according to the fluid in the valve V, and is provided to seal the surface between diaphragm 22 and the housing body 10. A backup washer pad or gasket 93 is provided between the diaphragm member 22 and a pusher rod assembly 92 of the actuator assembly A. The washer 93 is formed of a suitable material such as fluoroelastomer sold under the trademark Viton® from DuPont Dow Elastomers. The backup washer 93 provides a resilient, compliant material between the piston rod 92 and the diaphragm 22. The resilient fluoroelastomer washer 93 functions as a spring, and also provides protective wear prevention and overtravel protection.

A pusher rod 92 of the actuator assembly A has an inner end 92a contacting a rear surface 90b of the hub area 90 of the adjustable diaphragm member 22 to cause relative movement of the adjustable diaphragm member 22. The pusher rod 92 is received within a bushing member 94 for relative inward and outward movement. The bushing member 94 is mounted within the bearing block 70 and moves reciprocally to vary the relative position of the adjustable diaphragm member 22 and vary the volume of the flow receiving chamber 16.

The pusher rod 92 has an arcuate curved rear surface 92b at an opposite end from the adjustable diaphragm member 22 to engage and respond to a cylindrical outer surface 96a of a rotatable cylindrical bearing 96. The cylindrical bearing 96 is rotatably mounted on a bearing roller shaft 98 within the proportional valve V, and the cylindrical bearing 96 and roller shaft 98 are adapted for relative movement within the proportional valve V in response to a cam member 100 of the actuator assembly A.

The cam member 100 is preferably a vertically reciprocating cam which has a tapered contact surface 102. The cam member 100 is shown in a full open position in FIGS. 1 and 2 at its uppermost position. The cam member 100 is adapted to move upwardly and downwardly in response to an electric motor 104 which incrementally moves an extendable shaft 105 in response to control signals from the computer C or other input control signals from an operator or other input source. A suitable motor 104 in the preferred embodiment of the present invention is of the commercially available type known as a linear stepper motor.

The surfaces of the cam member 100 (FIG. 7) are ground and polished, both along the contact surface 102 and an oppositely facing rear portion 103. The contact surface 102 has an initial lower flat portion 102a (FIG. 7) extending vertically upwardly a suitable distance as indicated at D, such as 0.100", and the rearwardly tapering or sloped upper portion 102b. In the disclosed embodiment, the taper of surface 102b is at an angle 102c of 1.124° or an amount of 0.028" rearwardly from the vertical flat surface 102a. Depending upon the particular flow control application, and requirements, the slope of surface 102b can be differently configured or selected. The contact surface 102 of the cam member 100 thus has a shape and dimension conformed to calculations defining the requisite movement of the pusher rod 92 and the adjustable diaphragm member 22. As noted, the slope of surface 102b is chosen according to the desired parameters of flow through the proportional valve V and based on varying conditions of flow of fluid through the proportional valve V.

The cam member 100 is mounted, such as by a set screw 106, with shaft 105 of the motor 104. The shaft 105 extends from a motor shaft housing 108 of motor 104 and is advanced or withdrawn on activation of the motor 104. The motor 104 of valve V also preferably has a static characteristic of holding the presently established position (and thus the flow set point of the cam 100 of actuator A) without power or forces being applied to the shaft 105. The actuator A thus holds its last position without user intervention— unlike a spring loaded electromagnetic valve which loses position at power off mode. This is particularly helpful for processes that have steps which need fastest return to a previous flow setting, after a major process disruption occurs.

The motor 104 is mounted with a motor support plate 110 spaced from a motor mounting housing or plate 112 by spacer or mounting screws 114. The motor mounting housing or plate 112 is mounted to a lower plate or base member 116 of the valve V by mounting or spacer screws 118. The relative position of the motor plate 112 is initially adjusted to set the shut-off position of the valve V and also to locate the motor 104 and its shaft 105 on an axis perpendicular to the axis of movement of the pusher rod 92. The lower plate 116 and top support plate 60 are connected by a set of spacer or mounting screws 121 or other suitable structure such as a rear wall, if desired.

The bearing 96 which contacts the pusher rod 92 and a rear or back up bearing 120 of the actuator assembly A are mounted with a bearing holder plate 122 beneath the top support plate 60. The bearing holder plate 122 is connected by a shoulder bolt 124 with associated Belleville washer 126 to the top support plate 60. An adjustment block 130 is mounted to the top support plate 60 by an adjustment screw 132 and to the bearing holder plate 122 by an adjustment screw 134.

The adjustment structure of the valve V is used for initial set-up and calibration. Initially, the cam member 100 is moved to its fully upwardly extended position so that the flat surface 102a engages the rear of actuator rod 92. The diaphragm 22 is in a flow blocking position in contact with the annular flat surface 17 on the housing body 10. The position of adjustment screw 134 in the adjustment block 130 is moved to cause the backup bearing 120 to engage and support the cam member 100.

It can thus be seen that the valve V includes the external actuating pusher rod or shaft 92 that is mechanically moved by a customized profile cam contact surface 102. The actuating rod 92 presses against the adjustable diaphragm member 22 which is a flexible synthetic resin (typically PTFE). The cam contact surface 102 is configured so that it can be moved to position causing the diaphragm member 20 to close/open a PTFE flow path in chamber 16 between the diaphragm 22 and the PTFE housing body 10. The fluid flows toward the diaphragm 22 from passageway 14. The flow rate is controlled by the relative position of diaphragm 22 as established by the actuator A. Return flow from the chamber 16 is through an exit flow path beginning at outlet flow passage 18.

The relative size and position of the inlet passage 14 and outlet passage 18 in housing body 10 are customizable to match specific flow parameters. As the actuator rod 92 is pressed against the diaphragm 22, the flow through chamber 16 is gradually restricted. At the innermost end of the stroke of the actuator rod 92, fluid passage through chamber 16 is closed to stop flow of the fluid through the valve V.

As the actuator rod 92 is moved away from the diaphragm 22, the flow gradually increases, up to a maximum flow rate which is obtained through the valve V with the diaphragm 22 fully retracted. During the movement of the actuator rod 92, the flow rate is changing according to pre-programmed features in the profiled cam surface 102 based on the specific flow parameters for the exact fluid, pressures, temperature and viscosity.

The proportional valve V also permits adjustment of movement of diaphragm 22 by actuator A by setting the travel range of actuating cam 100. This adjustment provides a capability to compensate for any wear of the diaphragm 22 or its mating surface 26 in the housing body 10 in the flow control region of the valve. Over time, and especially when using polishing slurries, some component surface wear may occur. If no adjustment is provided, the fully closed flow position of the valve would eventually permit some amount of flow as wear occurs. Also, without adjustment component wear would compromise the accuracy of movement of cam 100 to precisely provide for proportional flow control over the specified possible flow range.

The valve V according to the present invention thus has programmable flow characteristics, allowing it to produce more accurate flow control over widely varying conditions or the fluid flow parameters, and is suitable for proportional flow control of most fluids, including highly corrosive liquids. Flow rates can be controlled with a great degree of resolution from a few mL/min up to several L/min with a relatively small size valve.

Flow characteristics can be programmed easily and inexpensively into the valve in a manufacturing/production environment, providing a low-cost solution. The flow system F of the present invention can be used with polishing slurries, with its adjustment for wear during extended use, as described above. This is advantageous, since certain industrial processes such as semiconductor processes often use these slurries which contain abrasive materials. As noted above, other uses for the flow system F include: gas or vapor flow control, steam flow control, or for flow control of mixtures of gas and liquid.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A flow controller for programmable flow control of a fluid over a range of flow rates, comprising:
    a housing body;
    a flow inlet in the housing body;
    a flow outlet in the housing body;
    a flow receiving chamber located in the housing body between the flow inlet and the flow outlet;
    an adjustable diaphragm member along a portion of the flow receiving chamber;
    an actuator controlling the position of the adjustable diaphragm member to regulate the flow of fluid through the housing body;
    a reciprocating cam having a tapered contact surface in the direction of reciprocating movement configured for programmable flow control over the range of flow rates, the tapered contact surface of the reciprocating cam engaging the actuator for incrementally moving the adjustable diaphragm member to control the position of the adjustable diaphragm member and thereby regulate the flow of fluid to a controlled flow rate; and
    a motor for moving the reciprocating cam to incrementally move the actuator to control the position of the adjustable diaphragm member.

2. The flow controller of claim 1, wherein the motor comprises:
    a linear stepper motor.

3. The flow controller of claim 1, wherein the fluid is a liquid slurry.

4. The flow controller of claim 1, further including the cam tapered contact surface being inclined at a slope in the direction of reciprocating movement of the cam.

5. The flow controller of claim 4, wherein the cam further includes a flat surface on a side opposite the tapered contact surface, and further including:
    a support bearing aligned with a actuator rod and engaging the flat surface on the cam.

6. The flow controller of claim 1, wherein the actuator comprises:
    a linkage transferring movement of the cam to the adjustable diaphragm member to incrementally move the adjustable diaphragm member.

7. The flow controller of claim 5, further including:
    a resilient pad between the actuator and the adjustable diaphragm member.

8. The flow controller of claim 1, further including:
    a seal for sealing the adjustable diaphragm member to the housing body.

9. The flow controller of claim 1, further including:
    a resilient pad between the actuator and the adjustable diaphragm member.

10. The flow controller of claim 1, wherein the adjustable diaphragm member comprises:
    a resilient diaphragm selectively movable inwardly and outwardly with respect to the flow receiving chamber to regulate the flow of fluid through the housing body.

11. The flow controller of claim 1, wherein the adjustable diaphragm member comprises:
    a resilient diaphragm member selectively movable inwardly to a closed position blocking the flow of fluid through the housing body.

12. The flow controller of claim 1, wherein the fluid is a corrosive fluid and the adjustable diaphragm member is formed of a corrosion resistant organic polymer.

13. The flow controller of claim 1, wherein the fluid is a corrosive fluid and the housing body is formed of a corrosion resistant organic polymer.

14. The flow controller of claim 3, wherein the liquid slurry is abrasive and causes component wear in the flow controller during service use, and wherein the actuator comprises:
    an actuator controlling the position of the adjustable diaphragm member to regulate the flow of fluid to a desired flow in response to changes in the flow due to component wear.

15. A flow measuring system for measuring and controlling flow of a fluid to a desired programmable flow over a range of flow rates, comprising:
    a flow measuring device measuring the flow of the fluid;
    a flow controller controlling the fluid flow to a desired flow, the flow controller comprising:
        a housing body;
        a flow inlet, in the housing body;
        a flow outlet in the housing body;
        a flow receiving chamber located in the housing body between the flow inlet and the flow outlet;
        an adjustable diaphragm member along a portion of the flow receiving chamber;
        an actuator controlling the position of the adjustable diaphragm member to regulate the flow of fluid through the housing body;

a reciprocating cam having a tapered contact surface in the direction of reciprocating movement configured for programmable flow control over the range of flow rates, the tapered contact surface of the reciprocating cam engaging the actuator for incrementally moving the adjustable diaphragm member to control the position of the adjustable diaphragm member and thereby regulate the flow of fluid to a controlled flow rate; and a motor for moving the reciprocating cam to incrementally move the actuator to control the position of the adjustable diaphragm member.

16. A flow control system for controlling the flow of a fluid to a desired programmable flow over a range of flow rates, comprising:

a flow measuring device measuring the flow of the fluid;

a control device comparing the measured flow with a specified flow, a flow controller controlling the fluid flow to a desired flow, the flow controller comprising:

a housing body;

a flow inlet, in the housing body;

a flow outlet in the housing body;

a flow receiving chamber located in the housing body between the flow inlet and the flow outlet;

an adjustable diaphragm member along a portion of the flow receiving chamber;

an actuator controlling the position of the adjustable diaphragm member to regulate the flow of fluid through the housing body;

a reciprocating cam having a tapered contact surface in the direction of reciprocating movement configured for programmable flow control over the range of flow rates, the tapered contact surface of the reciprocating cam engaging the actuator for incrementally moving the adjustable diaphragm member to control the position of the adjustable diaphragm member and thereby regulate the flow of fluid to a controlled flow rate; and a motor for moving the reciprocating cam to incrementally move the actuator to control the position of the adjustable diaphragm member, the control device activating the actuator to regulate the flow through the housing of fluid to the specified flow.

* * * * *